United States Patent

Dozeman et al.

[11] Patent Number: 6,051,681
[45] Date of Patent: Apr. 18, 2000

[54] PROCESS FOR THE PREPARATION OF A THERMOPLASTIC ELASTOMER

[75] Inventors: Albertus O Dozeman, Born; Pieter Gijsman, Sittard; Herman A. J. Schepers, Stein; Wilhelmus A. M. Debets, Sittard, all of Netherlands

[73] Assignee: DSM N.V., Heerlen, Netherlands

[21] Appl. No.: 09/079,217

[22] Filed: May 15, 1998

Related U.S. Application Data

[63] Continuation of application No. PCT/NL96/00433, Nov. 6, 1996
[60] Provisional application No. 60/007,752, Nov. 30, 1995.

[30] Foreign Application Priority Data

Nov. 17, 1995 [EP] European Pat. Off. .............. 95203152

[51] Int. Cl.⁷ ....................................................... C08K 3/22
[52] U.S. Cl. ......................... 528/485; 528/488; 528/492; 524/433; 524/437; 525/197; 525/232
[58] Field of Search ...................................... 528/485, 488, 528/492; 524/433, 437; 525/197, 232

[56] References Cited

U.S. PATENT DOCUMENTS

| | | |
|---|---|---|
| 4,311,628 | 1/1982 | Abdou-Sabet et al. . |
| 4,347,353 | 8/1982 | Miyata et al. ........................... 528/485 |
| 4,480,074 | 10/1984 | Wang . |
| 4,558,102 | 12/1985 | Miyata . |
| 5,239,000 | 8/1993 | Kim et al. . |
| 5,300,581 | 4/1994 | Otawa et al. ........................... 525/301 |
| 5,312,859 | 5/1994 | Preston et al. . |

FOREIGN PATENT DOCUMENTS

| | | |
|---|---|---|
| 097330 | 1/1984 | European Pat. Off. . |
| 0109375A1 | 5/1984 | European Pat. Off. . |
| 0519691A2 | 12/1992 | European Pat. Off. . |
| 93/17070 | 9/1993 | WIPO . |

*Primary Examiner*—Mark L. Warzel
*Attorney, Agent, or Firm*—Intellectual Property Group Pillsbury Madison & Sutro LLP

[57] ABSTRACT

The invention relates to a process for the preparation of a thermoplastic elastomer comprising preparing a blend of a rubber and a thermoplastic resin, in which the rubber is at least partially vulcanized by using a phenolic curative. The invention is that, to overcome problems with surface quality, an effective amount of a Lewis base is added after the desired degree of vulcanization of the rubber is obtained.

The invention also relates to a process for the preparation of an UV-stable thermoplastic elastomer.

13 Claims, No Drawings

PROCESS FOR THE PREPARATION OF A THERMOPLASTIC ELASTOMER

RELATED APPLICATIONS

This is a continuation of International Application No. PCT/NL96/00433 filed Nov. 6, 1996 which designated the U.S. This is also a complete application of U.S. Provisional Application Ser. No. 60/007,752 filed Nov. 30, 1995.

The invention relates to a process for the preparation of a thermoplastic elastomer comprising preparing a blend of a rubber and a thermoplastic resin in which the rubber is at least partially vulcanized by using a phenolic curative.

Such a process is known from U.S. Pat. No. 4,311,628, where a vulcanized (or cured) thermoplastic elastomer (or thermoplastic vulcanizate, TPV) is made from a polyolefin resin and an EPDM rubber. The phenolic curative, used to prepare such a TPV, generally comprises a phenolic resin, sometimes in the presence of a cure activator; the activator generally includes metal salts and halogen donors.

A defect of the known process is that products made from the so-obtained thermoplastic vulcanizates often show surface cracking within a short period of time. The products often have an undesired surface roughness. Another problem is the low efficiency of hindered amine light stabilizer-compounds (the socalled HALS-compounds), added as UV-stabilizer, compared to their efficiency in thermoplastic resin compounds.

Surprisingly it has been found that the above mentioned problems can be significantly reduced or even completely solved, which results in a thermoplastic elastomer with improved physical, especially surface properties.

The invention is characterized in that an effective amount of a Lewis base is added after the desired degree of vulcanization of the rubber is obtained.

According to the Lewis definition, a base is a substance that can furnish an electron pair to form a covalent bond. Thus a base is an electron-pair donor. This is the most fundamental of the base concepts, and the most general; it includes all the other concepts, like the Lowry-Brønsted definition, according to which an base is a substance that takes up a proton.

The rubber to be used in the process for the preparation of the thermoplastic elastomer according to the present invention may be any natural or synthetic rubber which can be cured with a phenolic curative. This is especially the case for ethylene α-olefin diene terpolymer (EADM) and for butyl-rubber. The EADM-rubber contains as the second monomer an α-olefin, which can be propylene, butene-1, pentene-1, hexene-1, octene-1 or the like or a branched isomer thereof like 4-methylpentene-1, and further styrene, α-methylstyrene and the like. Also mixtures of α-olefins are applicable. Preference is given to propylene and/or butene-1 as the α-olefin. Greater preference is given to propylene; the resulting terpolymer is an ethylene/propylene/diene terpolymer (EPDM).

The third monomer in such an EADM or EPDM can be any conventionally applied monomer in such rubber, like hexadiene-1,4, dicyclopentadiene or ethylidene norbornene. Preference is given to ethylidene norbornene as third monomer.

The butylrubber, when used as the essential rubber element of the thermoplastic elastomer of the present invention, can be an amorphous copolymer of isobutylene and isoprene or an amorphous terpolymer of isobutylene, isoprene and a divinyl aromatic monomer. The term "butylrubber" also comprises the halogenated form of the above mentioned co- and terpolymer. Thermoplastic elastomers based on butyl-rubber are disclosed in e.g. U.S. Pat. No. 4,130,534 and EP-A-376,227.

The thermoplastic resin to be used in the process for the preparation of the thermoplastic elastomer according to the present invention may be any polymer which behaves like a thermoplast in the temperature range between 100 and 350° C.; care should be taken that the processing temperature (i.e. the temperature at which the thermoplastic elastomer is prepared or used) is sufficiently lower than the decomposition temperature of the resin. Examples of such resins are thermoplastic resins like polyesters, nylons, polycarbonates, styrene/acrylonitril copolymers as well as the preferred thermoplastic polyolefin resins. In the latter case, preference is given to polyethylene and polypropylene, either as homopolymer or as copolymer.

The thermoplastic elastomer resulting from the process generally comprises 20–500 parts of rubber per 100 parts of thermoplastic resin, more preferably between 30–400 parts and most preferred between 50 and 300 parts.

The rubber in the thermoplastic elastomer is at least partially cured with the phenolic curative. Any phenolic curing system which cures the rubber is suitable in the invention. Preference can be given to the phenolic curing systems mentioned in the above cited USP '628 (indicating both the phenolic curing resin and the cure activator).

In the present process for the preparation of the thermoplastic elastomer the rubber is at least partially vulcanized. One method for determining the degree of vulcanization is by measuring the amount of rubber, extractable from the prepared product by using boiling xylene as the extractant. Such a method can be found in the earlier mentioned USP '628.

According to such a method, the rubber in the thermoplastic elastomer prepared in the process of the invention is vulcanized to the extent that not more than 50%, preferably not more than 15% and even more preferred not more than 5% of the rubber is extractable in boiling xylene.

In the process of the present invention an effective amount of a Lewis base is added at a moment where the desired degree of vulcanization of the rubber is obtained. As a rule, an amount of 0.1–10 parts of the Lewis base, per 100 parts of rubber and thermoplastic resin, is sufficient and effective to obtain the benificial effects of the present invention. More preferably, an amount of 0.25–5 parts is used.

Any ingredient which behaves like a Lewis base according to the given definition is suitable for use in the present invention. Components which can be used as the Lewis base are, for example,:
metal oxides, like magnesium oxide or zinc oxide,
hydrotalcites,
amine-functional dendrimers,
polyethers,
epoxides,
metal hydroxides (like $Mg(OH)_2$),
metal carbonates (like $CaCO_3$).
Preference is given to the use of a compound selected from the group of hydrotalcites.

The hydrotalcite material may be a natural mineral or a synthetic hydrotalcite-like material; it may be used in dried (calcined or anhydrous) or partially dried form. When it contains a surface active agent, the latter is preferably anionic.

The hydrotalcite materials useful in the method of the invention are generally defined as "magnesium-aluminiumhydroxide carbonate hydrates", but they need not contain carbonates for the purposes of the present invention.

An example of a synthetic hydrotalcite is a material having the formula $Mg_6Al_2(OH)_{16}CO_3.4H_2O$. A synthetic hydrotalcite-like compound available from Kyowa Chemical Company Ltd. under the tradename DHT-4A has the formula $Mg_{4.5}Al_2(OH)_{13}CO_3.3.5\ H_2O$. A form containing less water of hydration (i.e. less than 3.5 moles of water of hydration per mole of compound) is designated DHT-4AA.

One group of suitable carbonate free hydrotalcite-like materials has the formula:

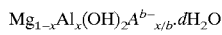
$$Mg_{1-x}Al_x(OH)_2 A^{b-}_{x/b}.dH_2O$$

in which x is greater than 0 and less than or equal to 0.5, d is zero or a positive number, b is a positive integer, and $A^{b-}$ is an anion having the valency of b. Such materials are described in U.S. Pat. Nos. 4,284,762 and 4,347,353.

Synthetic hydrotalcites are also described in detail in *Clays and Clay Minerals*, 28, No. 1 at page 50–56 (1980).

Another type of (carbonate-free) hydrotalcite material suitable for use in the process of the invention has the formula:

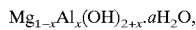
$$Mg_{1-x}Al_x(OH)_{2+x}.aH_2O,$$

in which $0<x\leq0.5$ and $0<a<2$. This type of material is described in U.S. Pat. No. 4,379,882.

The addition of an effective amount of a Lewis base is also beneficial for preparing thermoplastic elastomers to which UV-stabilizers, like in the form of HALS-compounds, are added. The efficiency of such HALS-compounds is significantly improved when using the process of the present invention.

The addition of HALS-compounds alone (i.e. without using the addition of the Lewis base) does only bring a temporary UV-stability of the thermoplastic elastomer. After a relative short period of time the UV-stability deteriorates. This problem is overcome by adding, according to the process of the present invention, to the blend, after the desired degree of vulcanization is obtained, an effective amount of both the Lewis base and the HALS-compound.

The skilled man is aware of the commercial existance of different types of HALS-compounds, which he can select for its purpose. As examples of such compounds can be mentioned: Tinuvin®123; 144; 622; 765; 770 and 780, Hals®57; 62; 63; 68; Dastib®845, Uvinul®-4050, Chimasorb®-944 and HMBTAD®, all compounds being based on the effectiveness of the presence of one or more piperidinyl-groups.

A criterium for the HALS-compound is that it on one hand is not too volatile under processing conditions (i.e. at temperatures between 100 and 300° C.) as a result of which the compound could evaporate from the thermoplastic elastomer, and on the other hand be sufficient mobile to be able to migrate through the product. This is preferably achieved when the HALS compound has a molecular weight between 250 and 5000, more preferably between 300 and 1000.

The HALS-compound used in preparing the thermoplastic elastomer is generally used in an amount not exceeding 7.5 wt. % per 100 wt. % of the thermoplastic elastomer; more preference is given to an amount not exceeding 5 wt. %; even more preferred is an amount of 0.1–2.5 wt. %.

It is preferred that in the process for preparing the at least partially cured thermoplastic elastomer, a blend comprising uncured rubber and thermoplastic resin is first treated with the phenolic curative and thereafter the Lewis base (and if used the HALS compound; preferably in the sequence: first the Lewis base and then the HALS-compound) is added. Then optimal results are obtained.

The process for preparing the thermoplastic elastomer can be any process by which a blend of an at least partially cured rubber and a thermoplastic resin can be obtained. Preference is given to a process in which the blend is made by dynamic curing (i.e. the process of mixing and curing of the rubber and the thermoplastic resin are taking place in the same process step). It is to the skilled man to avoid severe premature vulcanization (curing) while the mixing process is not completed. Reference can be given to the above mentioned USP '628 and USP '534. Equipment qualified to be used in a process according to the invention can be any mixing apparatus for blending polymers. The process can be executed in batch equipment (like Banbury mixers); preference is given to the use of continuous operating equipment, like a twinscrew extruder. Care should be taken that all ingredients become well-mixed.

It is also possible to prepare the thermoplastic elastomer of the present invention by first preparing a blend of already, at least partially, vulcanized rubber with the thermoplastic resin and adding to said blend an effective amount of the Lewis base, and where appropriate, the HALS-compound. Care should be taken that the particle size of the so-used rubber is sufficiently small (in the order of 1–50 μm) in order to obtain adequate properties.

Next to the above mentioned ingredients the thermoplastic elastomer can contain other additives and fillers commonly used in these types of products, like carbon black, pigments, flame retardants, processing aids, extender oils etc.

In the thermoplastic elastomer of the invention preferably also an UV-absorber is present. Such an absorber is known per se; reference can be made to J. Pospišil and P. P. Klemchuck in: "Oxidation inhibition in Organic Materials", vol. I, pag. 23 ff (1990). Examples of UV absorbers are cyanoacrylates, phenylsalicylates, oxanilides, (di) hydroxybenzophenones and hydroxyphenylbenzotriazoles.

The products obtainable by a process according to the present invention are useful for making a variety of articles like hoses or mouldings. These articles can be made by extrusion, injection or compression moulding techniques. They are especially useful in those type of applications where surface properties and UV-stability play a major role.

The invention will be elucidated by the following examples and comparative experiments. They are not intended to form in any way a restriction of the invention.

EXAMPLES

Comparative Experiment A

A thermoplastic vulcanizate was prepared in a twinscrew extruder by dynamic vulcanization of a blend of 38 parts of polypropylene and 124 parts of an EPDM-rubber (comprising 50 wt % of extender oil), under the influence of a curing system comprising (per 100 parts of EPDM) 5 parts of a phenolic curing resin (Schenactady SP1045) and 2.5 parts of $SnCl_2.2H_2O$ as activator. This resulted in a thermoplastic vulcanizate with a rubber extractable content in boiling xylene of 2.5%. To 100 parts of this TPV was added 1 part of Tinuvin 770 as UV-stabilizer; the so-obtained product was tested for UV-stability in a Wheather-O-Meter (W.O.M. Ci-64A (Xenon lamp, intensity 0.35 W/m² at 350 nm, boro—boro silicate filters, black panel temperature: 63° C, dry-wet cycle, 102/18 min. and 55% rel. humidity)). After a wheathering time of only 1000 hours the first surface cracks were observed.

Example I

To the same TPV as in Comparative Experiment A was added 2 parts of DHT-4A, followed by 1 part of Tinuvin 770

(all per 100 parts of TPV). The first surface cracks were observed after a wheathering time of more than 4000 hours.

Comparative Experiment B

The process of Comparative Experiment A was used to prepare a TPV comprising 48 parts of polypropylene and 104 parts of an EPDM-rubber (comprising 50 wt % of extender oil). The amount of curing system used was (per 100 parts of EPDM) 2.5 parts of phenolic curing resin (Schenactady SP1045) and 2.5 parts of $SnCl_2.2H_2O$ as activator. This resulted in a TPV having a rubber extractable content of 8.5%. To 100 parts of this TPV were added 1.5 parts of an UV-absorber (Tinuvin 328) plus 1.5 parts of the UV-stabilizer Tinuvin 770. After 500 hours of wheathering time in QUV the retention of mechanical properties was determined: the retention in tensile strength ($\sigma_b$) was 91.3%; the retention in elongation at break ($\epsilon_b$) was 84.2%.

Example II

To 100 parts of the TPV of Comparitive Experiment B were added 2 parts of DHT-4A, after which 1.5 parts of Tinuvin 238 and 1.5 parts of Tinuvin 770 were added. The retention results of the mechanical properties (tested under the same conditions as in Comparative Experiment B) were:

$\sigma_b$=110.9% ; $\epsilon_b$=102.1%

Comparative Experiment C

Comparative Experiment B was repeated, but with 0.75 parts of Tinuvin 328 and 0.75 parts of Tinuvin 770. The retention results were:

$\sigma_b$=90.7% $\epsilon_b$=82.9

Example III

Example II was repeated, but with 0.75 parts of Tinuvin 328 and 0.75 parts of Tinuvin 770. The retention results were:

$\sigma_b$=102.8%; $\epsilon_b$=94.2%

Comparative Experiment D

A TPV having the composition as described in Comparative Experiment A was prepared through a dynamic vulcanisation in a Banbury mixer, whereafter the product was fed to an extruder for pellatizing. Thereafter the granulate was extruded into a strip and this strip was judged on surface roughness; by hand, with the use of a microscope with a 200-fold magnification and using a Surftest (based on DIN 4768). The result was:

a) a rough touch, as felt with the tip of the finger;
b) large surface roughness, seen through the microscope;
c) the average roughness $R_a$, according to the surftest and based on the formula:

$$R_a = \frac{1}{L}\int_O^L f(x)dx,$$

with L=measuring length,
f(x)=surface roughness curve,
measured 5 times (with L being 2.5 cm), had a value of 5.1 μm.

Example IV

An analogous process as described in Comparative Experiment D was performed but at the end of the mixing process in the Banbury mixer, an amount of 0.5 parts of DTA-4A (per 100 parts of TPV) was added to the contents of the Banbury mixer. Thereafter the product was fed to an extruder for pelletizing after which the granulate was extruded into a strip which was judged on surface roughness. The result was:

a) a smooth touch, as felt with the tip of the finger;
b) a microscopic much less rough surface;
c) in the Surftest an $R_a$-value of 1.5 μm was determined.

What is claimed is:

1. A process for the preparation of a thermoplastic elastomer comprising preparing a blend of a rubber and a thermoplastic resin, in which the rubber is at least partially vulcanized by using a phenolic curative, wherein an amount of 0.1 to 10 parts of a hydrotalcite per 100 parts of rubber and thermoplastic resin and an amount not exceeding 7.5 wt. % of a HALS-compound per 100 wt. % of the thermoplastic resin is added after a predetermined degree of vulcanization of the rubber is obtained.

2. A process according to claim 1, wherein the hydrotalcite is used in an amount of 0.25–5 parts, per 100 parts of rubber and thermoplastic resin.

3. A process according to claim 1, wherein the rubber comprises at least one member selected from the group consisting of EADM rubber and butyl rubber.

4. A process according to claim 3, wherein the EADM rubber comprises a terpolymer of ethylene, propylene and ethylidene norbornene.

5. A process according to claim 1, wherein the thermoplastic resin comprises a thermoplastic polyolefin resin.

6. A process according to claim 5, wherein the thermoplastic resin comprises at least one member selected from polyethylene and polypropylene.

7. A process according to claim 1, wherein the rubber in the thermoplastic elastomer is vulcanized to the extent that not more than 15% of the vulcanizable rubber is extractable in boiling xylene.

8. A process according to claim 7, wherein the rubber is vulcanized to the extent that not more than 5% of the vulcanizable rubber is extractable in boiling xylene.

9. A process according to claim 1, wherein in the preparation of the elastomer 30–400 parts of rubber per 100 parts of thermoplastic resin are used.

10. A process according to claim 1, wherein the added HALS-compound has a molecular weight between 250 and 5000.

11. A process according to claim 10, wherein the added HALS-compound has a molecular weight between 300 and 1000.

12. A process according to claim 1, wherein the added HALS-compound is used in an amount not exceeding 5 wt. %.

13. A process according to claim 12, wherein the added HALS-compound is used in the amount between 0.1 and 2.5 wt. %.

* * * * *